United States Patent [19]
Knol

[11] 3,834,474

[45] Sept. 10, 1974

[54] METHOD AND APPARATUS FOR DETERMINING THE QUANTITY OF A BULK MATERIAL DEPOSITED ON A CONVEYOR

[76] Inventor: Willem Knol, Oude Grensweg, 96 Hengelo (O.), Netherlands

[22] Filed: Oct. 15, 1971

[21] Appl. No.: 189,520

[30] Foreign Application Priority Data
Oct. 16, 1970 Netherlands.................. 7015227

[52] U.S. Cl.................. 177/1, 177/210, 198/39
[51] Int. Cl. .................. G01g 3/00, G01g 9/00
[58] Field of Search........... 177/1, 210, 264; 198/39

[56] References Cited
UNITED STATES PATENTS

| | | | |
|---|---|---|---|
| 1,203,285 | 10/1916 | Webber | 198/39 X |
| 1,885,356 | 11/1932 | Karrer | 177/1 |
| 2,608,372 | 8/1952 | Ferguson et al. | 177/1 |
| 2,623,636 | 12/1952 | Pounds | 177/1 |
| 3,115,201 | 12/1963 | Brumbaugh | 177/210 |
| 3,196,963 | 7/1965 | Klass et al. | 177/210 |
| 3,390,731 | 7/1968 | Schierbeek | 177/210 |
| 3,545,611 | 12/1970 | Husome | 177/1 |
| 3,550,771 | 12/1970 | Spyropoulos | 177/210 |
| 3,595,329 | 7/1971 | Withnell et al. | 177/1 |
| 3,603,416 | 9/1971 | Spurlin | 177/1 |
| 3,623,559 | 11/1971 | Folkes | 177/1 |
| 3,631,961 | 1/1972 | Strydom | 198/39 X |
| 3,648,839 | 3/1972 | Bradshaw et al. | 177/1 |
| 3,679,010 | 7/1972 | Bullivant | 177/1 X |

FOREIGN PATENTS OR APPLICATIONS

| | | | |
|---|---|---|---|
| 260,730 | 7/1965 | Australia | 177/210 |
| 663,760 | 12/1951 | Great Britain | 177/210 |
| 1,113,992 | 5/1968 | Great Britain | 177/210 |

*Primary Examiner*—Richard B. Wilkinson
*Assistant Examiner*—Stanley J. Witkowski
*Attorney, Agent, or Firm*—Burns, Doane, Swecker & Mathis

[57] ABSTRACT

The weight of bulk material deposited on a conveyor is measured with reference to the force exerted by the conveyor on the material to accelerate it in the direction of transport. When the dispensed material contacts the conveyor belt, the belt applies a force to the material in the conveying direction to accelerate the material from its initial velocity to the velocity of the conveyor belt. An equal and opposite reaction force is inherently applied to the conveyor by the material as the material is deposited onto the conveyor. The reaction force is directly related to the quantity of material dispensed onto the conveyor belt since force $F$, acceleration $a$ and mass $m$ (a quantity measurement) are related by the basic equation $F = ma$. A suitable force measuring apparatus may be applied to detect the force or quantity measurement.

19 Claims, 1 Drawing Figure

PATENTED SEP 10 1974  3,834,474
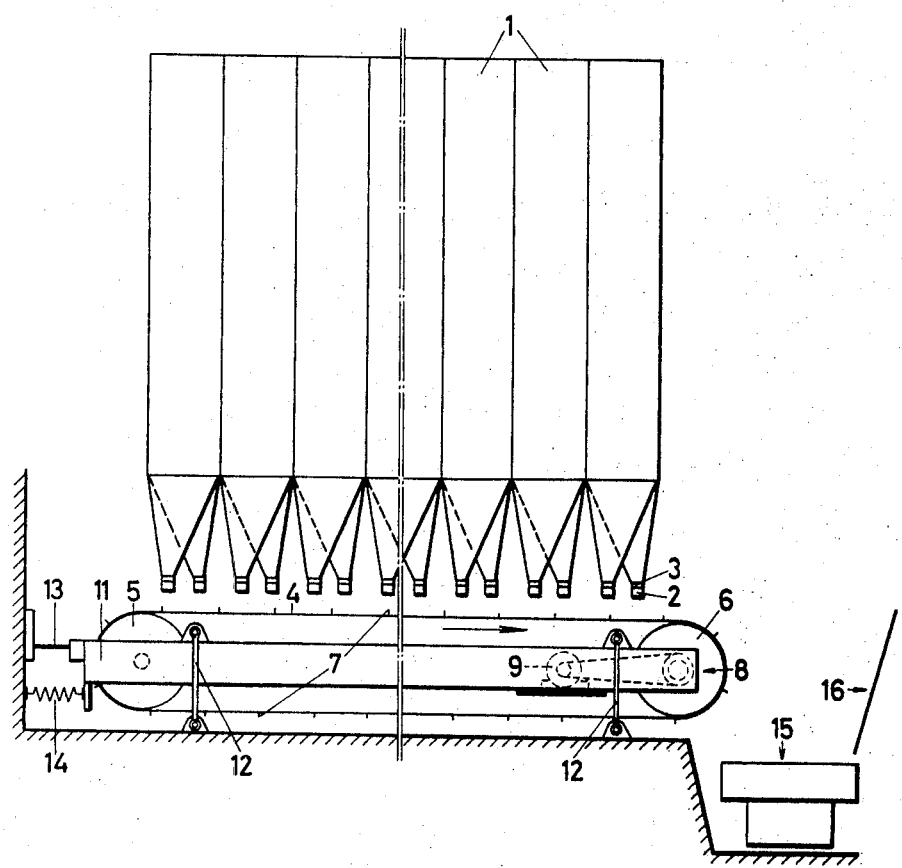

METHOD AND APPARATUS FOR DETERMINING THE QUANTITY OF A BULK MATERIAL DEPOSITED ON A CONVEYOR

This invention relates to a method of and a apparatus for metering and/or dosing bulk material, which material is conveyed by means of a conveyor over some distance while the quantity displaced by the conveyor is metered.

Such a method and apparatus are known from, for instance, Dutch patent application 6,603,474, open to public inspection, in which the material is conveyed by a conveyor belt which in a given section is supported by a roller which co-operates with a weighing device. The weighing device co-operates with electronic means which integrates the weights measured in correlation to the conveying speed in order to determine the total quantity passed. Such a device has the drawback, especially when it concerns a conveyor belt with a considerable length on which bulk material is supplied at various places, that it is less suitable for accurate dosage, because there is not yet integrated bulk material between the supply station and the measuring staton, the quantity by weight of which may vary. Another apparatus which does not have this drawback is described in Dutch patent 112,215, in which an elongated measuring box is shown over which the mouths of various supply containers are located, from which dosages can alternately be supplied. A conveyor is provided in the measuring box. The total weight of the box with accessories and its content of bulk material is measured by measuring the horizontal component produced by the substantially vertical swivelling support of the box. When processing the measuring results the total weight of the box and accessories has to be eliminated, which makes heavy demands on the accuracy, quality and state of the apparatus, while the speed at which the apparatus can operate is too limited, since it is necessary to apply an intermittent method in it.

It is an object of the present invention to provide a method, as well as apparatus for carrying out the method, with which the quantity of material conveyed by the device can be accurately, quickly and reliably determined, in such a way that dosing may be done at considerable speed, even when it has to be effected from a large number of different containers. According as the installation has more supply containers and when the material dosed therefrom has to be mixed, operational speed is imporatnt in view of costs.

In the method according to the invention the force exerted on the bulk material by the conveyor to accelerate the bulk material in the conveying direction is measured for the quantity measurement. Said acceleration force can be measured by measuring the power taken up the driving means of the conveyor; frictional losses and the like in the driving and conveying device have to be taken into account. A preferred embodiment for the application of the method of the invention is that the reaction force is measured to which the conveyor is subjected as a result of the acceleration force supplied. Frictional losses in the device are then of no importance. It can also be arranged that the weight of the device and accessories does not supply a component to the measuring element so that the latter only measures the reaction force occurring as a result of the acceleration. Operating the conveyor, which may be of any type, such as a screw, chain or belt conveyor, at high speed requires, on the one hand, a large acceleration force to accelerate the material to be conveyed in the conveying direction, which promotes accuracy of measurement; and on the other hand increases the rate of operation of the apparatus. Both factors are therefore favorably influenced by one and the same measure. The operating speed, and hence the profitability and the accuracy of the apparatus may consequently be greatly increased. Owing to the measuring data being electronically processed, there are virtually no limits to the increase in speed. In order for the acceleration force to be effectively controlled, the conveyor, preferably a belt conveyor, amy be provided with carrier means such as a scraper flight extending transversely to the conveying direction. A belt conveyor has the additional advantage that the material falls from the conveyor at the delivery end at the reversing roller by centrifugal operation of the conveyor without generating a reaction force. As a quantity of the material is measured immediately it is deposited on the conveyor, the final result will be known at any time and virtually without phase delay, especially with electronic data processing, to which the control means of the installation can react. It is virtually impossible that afterrun errors occur, since these could only be caused by the bulk material that is located in the path of fall from the mouthpiece of the storage containers to the conveyor. The distance between the mouthpieces and the conveyor may be minimal and remains the same all the time.

The apparatus is preferably embodied in such a way that the weight of the conveyor and the material thereon and the accessory construction parts has no component in the conveying direction in which the reaction force is measured. By virtue of this a very accurate measuring result can be obtained in a simple manner. It may be desirable for the co-operation with the measuring element to exert a specific preload on said element, for instance by means of a constant spring load on the conveying unit. It is obvious that a constant quantity can be easily eliminated from the data precessing.

The accompanying drawing shows a schematic representation of an apparatus according to the invention.

Referring to the drawing, there are shown a number of silos 1 having outlet funnels at the bottom, terminating in mouthpieces 2 with closing means 3. The closing means 3 can be operated in a way that will not be further discussed, partly in dependence on the measuring data. A conveyor is located under mouthpieces 2 of the chutes, said conveyor comprising an endless conveyor belt 4, running over reversing rollers 5 and 6. The conveyor belt is provided with carrier means such as the illustrated blades or scraper flight 7, extending perpendicularly to the plane of the conveyor belt 4, and if necessary, they can extend downwards in a slanting position, for instance enclosing an acute angle with the belt 4, opening in the conveying direction. The reversing roller 6 is connected with the driving means 8. The electric motor 9 of the means 8, to which current is supplied via flexible wires not shown, is of the variable-speed type.

The motor 9 could also be mounted separately on the ground, using transmitting elements with which no undesirable reaction force will be generated, for instance a suitably arranged belt or chain or a transmission extending longitudinally to the conveyor, comprising telescopic elements, so that a couple is formed in the sense of rotation only without exerting a force in the direction of the axis of the transmission means.

In the example shown in the drawing the motor 9 is suspended together with the belt conveyor unit 4, 5, 6 in a frame 11 by means of swivelling posts 12, which are in vertical position. The frame 11 is in contact with a measuring element 13, which co-operates for instance with strain gauge strip, so that the force exerted thereon can immediately be electronically processed. In order to ensure the contact of frame 11 and measuring element 13 the frame may be loaded with a constant force by a spring 14. The displacement of the frame 11 when a strain gauge is used, is so small that the suspension posts 12 hardly make an angular movement which might result in a measurable horizontal component of the weight of the conveying means.

The frame 11 naturally may also be supported by rollers, on an air cushion, liquid and the like, which types of supports cannot deliver a horizontal force.

For processing the measurements of the element 13, in correlation to the driving speed of the belt, electronic processing means 17 may be applied in a known manner, which need not be described.

Reference numeral 15 indicates a discharge conveyor in general, above which a baffle 16 is provided in case the belt 4 runs at high speed.

The illustrated embodiment of invention operates as follows:

As shown, the mounting of the entire conveyor system is such that the conveyor is suspended and may move relatively freely in the plane of the horizontal. While the conveyor belt 4 is driven along a conveying path which, in the illustrated embodiment is horizontal, material is dispensed onto the conveyor belt with a velocity component of predetermined magnitude e.g., a zero velocity component in the conveying direction.

When the dispensed material contacts the conveyor belt, the belt applies a force to the material in the conveying direction to accelerate the material from its initial velocity to the velocity of the conveyor belt. There is, of course, an equal and opposite force (a reaction force) inherently applied to the conveyor by the material. This reaction force is directly related to the quantity of material dispensed onto the conveyor belt since force $F$, acceleration $a$ and mass $m$ (a quantity measurement) are related by the basic equation $F=ma$.

Since the conveying system is free to move horizontally as a unit, the reaction force $F$ tends to move the conveying system in the horizontal plane opposite the direction of travel of the conveyed material. The force required to counteract the tendency of the conveying system to move rearward is related to the reaction force which in turn is a function of material quantity, i.e., a function of material mass $m$, and of acceleration $a$, i.e., the rate of change of velocity from the initial velocity of the material to the conveyor velocity. Any suitable conventional force measuring means such as the element 13 cooperating with a strian gauge, may be employed to sense the described reaction force, and since the sensed force will inherently vary in direct relation to the quantity of material accelerated by the conveyor, the sensed reaction force is a manifestation of material quantity.

As was previously stated, the drive motor 9 may be of the variable-speed type and the force measurements of the elemnt 13 may be correlated with the driving speed of the conveyor belt by the electronic processing means 17 to provide a quantity measurement. Of course, it will be appreciated that typically the speed of the drive motor 9 is not deliberately varied after it has been set at a convenient rate in which case the speed of the drive motor 9, because it is substantially constant, need not be of concern in the processing of the force related signals. For example, with the conveyor belt operated at a substantially constant speed, the force measurement may be converted into a quantity measurement by the processor 17 through conventional processing techniques such as through an empirically obtained relationship between force and quantity for any particular conveying system.

Of course, it will be appreciated by one skilled in the art to which the invention pertains that a quantity measurement, in terms of units of material weight, may not be necessary in dosing implementations and the like. In such implementations, the relative quantities of various conveyed materials may be of interest and the measured reaction force may be used directly as the quantity measurement without the need for conversion to the usual units of quantity measurement.

I claim:

1. A method for measuring the quantity of a material dispensed onto a moving conveyor which is operable to convey the material in a substantially horizontal direction comprising the steps of:
   dispensing the material onto the conveyor in a substantially vertical direction from a dispenser above the conveyor so that the velocity component of the material in the conveying direction of the conveyor is substantially zero; and,
   sensing, as a manifestation of the quantity measurement, a reaction force to which the conveyor is subjected in order to accelerate the material in the conveying directon from substantially zero velocity to the velocity of the conveyor.

2. A method of measuring the quantity of a material conveyed from a dispensing zone over some distance by means of a conveyor while the material is being conveyed comprising the steps of dispensing the material from the dispensing zone at a first velocity in a conveying direction onto the conveyor with the conveyor moving in the conveying direction at a conveying velocity, transmitting to a measuring element a reaction force exerted by the material on the conveyor as the material is accelerated from the first velocity to the conveying velocity in the conveying direction, and measuring the reaction force transmitted to the measuring element as a manifestation of material quantity.

3. The method of claim 2 wherein the material is dispensed onto the conveyor in a direction relative to the conveying direction such that the material produces a zero velocity component on the conveyor in the conveying direction.

4. The method of claim 3 wherein the conveyor is operable to convey the material in a substantially horizontal direction and wherein the material is dispensed in a substantially vertical direction from a dispenser above the conveyor, the velocity component of the material thereby being zero in the conveying direction.

5. A method according to claim 2, wherein the measuring results are processed by an integrating device.

6. A method according to 2, wherein one and the same conveyor conveys bulk material from various containers for mixing purposes.

7. An apparatus comprising a conveyor including means for receiving material at a first velocity and delivering said material after moving it at a conveying velocity over a conveying path in a conveying direction, and means cooperable with said conveyor for measuring the quantity of material moving along the conveying path, said measuring means including means for determining the reaction force to which the conveyor is subjected in order to accelerate the material from said first velocity in the conveying direction to the conveying velocity in the conveying direction.

8. An apparatus according to claim 7 wherein the measuring means is provided with, means for integrative processing of the measuring data.

9. An apparatus according to claim 7 including electronic processing means connected to said measuring means for processing the determined reaction force.

10. An apparatus according to claim 7, wherein said conveyor is provided with carrier means extending transversely to the conveying direction.

11. An apparatus according to claim 7, including a variable speed drive motor for driving said material receiving and delivering means of the conveyor.

12. An apparatus according to claim 7 wherein the conveyor is of the endless conveyor belt type.

13. An apparatus according to claim 7, including a source of energy for driving the conveyor, wherein the source of energy driving the conveyor is supported together with the conveyor as one single unit.

14. An apparatus according to claim 7, wherein the conveyor is supported in such a way that the weight of the conveyor has no component in the conveying direction.

15. An apparatus according to claim 14, further comprising at least one means for preloading the measuring means measuring the reaction force to which the conveyor is subjected.

16. The apparatus of claim 7 wherein said conveyor is disposed to move the material over a substantially horizontal conveying path and including means for dispensing the material onto said conveyor in a substantially vertical direction from above the conveyor so that said first velocity is zero in the conveying direction, whereby the force exerted on the material by the conveyor is directly related to the mass of the dispensed material.

17. The apparatus of claim 16 wherein the conveyor is mounted for movement in the horizontal direction, said measuring means comprising means for measuring the reaction force of the conveyor in the horizontal direction.

18. The apparatus of claim 17 including means for exerting a constant force on said conveyor in the conveying direction to preload said reaction force measuring means.

19. Apparatus comprising:
a conveyor operable to convey bulk material along a substantially horizontal conveying path, said conveyor being mounted for movement in the horizontal direction;
dispensing means for selectively dispensing bulk material onto the conveyor in a substantially vertical direction so that the material has a substantially zero velocity component along the horizontal conveying path; and,
means responsive to movement of the conveyor in the horizontal direction for sensing a reaction force to which the conveyor is subjected in the horizontal direction in accelerating the material from said zero velocity to the velocity of the conveyor, the sensed reaction force providing a manifestation of the quantity of the material dispensed by said dispensing means.

* * * * *